US012619653B2

(12) United States Patent
Ishibashi et al.

(10) Patent No.: US 12,619,653 B2
(45) Date of Patent: May 5, 2026

(54) REPAIR SEARCH SYSTEM

(71) Applicant: Honda Motor Co., Ltd., Tokyo (JP)

(72) Inventors: Takayuki Ishibashi, Tokyo (JP);
Takahiro Yoshii, Tokyo (JP); Shogo Shibahara, Tokyo (JP); Yudai Okabe, Tokyo (JP); Hirofumi Yabu, Tokyo (JP); Kohei Mukaihara, Tokyo (JP); Kohei Saito, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 67 days.

(21) Appl. No.: 18/587,402

(22) Filed: Feb. 26, 2024

(65) Prior Publication Data

US 2024/0330352 A1     Oct. 3, 2024

(30) Foreign Application Priority Data

Mar. 28, 2023     (JP) ................................. 2023-050890

(51) Int. Cl.
*G06F 16/383*          (2019.01)
(52) U.S. Cl.
CPC ................................. *G06F 16/383* (2019.01)
(58) Field of Classification Search
CPC .................................................... G06F 16/383
See application file for complete search history.

(56) References Cited

U.S. PATENT DOCUMENTS

| | | | | |
|---|---|---|---|---|
| 2013/0317694 A1* | 11/2013 | Merg | ..................... | G07C 5/008 |
| | | | | 701/31.6 |
| 2014/0201194 A1* | 7/2014 | Reddy | ................... | G06F 16/248 |
| | | | | 707/722 |
| 2016/0071334 A1* | 3/2016 | Johnson | ............... | G07C 5/0808 |
| | | | | 701/29.1 |
| 2018/0068279 A1* | 3/2018 | Merg | ..................... | G06F 16/288 |

FOREIGN PATENT DOCUMENTS

JP          2002157270 A     5/2002

* cited by examiner

*Primary Examiner* — Apu M Mofiz
*Assistant Examiner* — Husam Turki Samara
(74) *Attorney, Agent, or Firm* — Duft & Bornsen, PC

(57) ABSTRACT

A repair search system proposing a repair method corresponding to a trouble code, the repair search system includes a microprocessor and a memory coupled to the microprocessor. The memory has a database storing the trouble code and the repair method performed in a past in association with each other. The microprocessor is configured to perform: by using a plurality of different search conditions created with the trouble code of a troubled vehicle as a reference, searching the database for a plurality of repair methods corresponding to the trouble code by every search condition; scoring each of repair method groups included in a search result acquired by every search condition; and outputting information indicating a repair method group with a highest score among the repair method groups.

7 Claims, 5 Drawing Sheets

*FIG. 1*

〈Vehicle Information〉
VIN    : XXXX
Model  : XXXX
MY     : 2020
Factory : MMSB

〈Search Condition〉
DTC    : PO706
Look   : 1

| Look + |     | Look - |

| Recommended Parts Ranking | | | | |
| --- | --- | --- | --- | --- |
| * | Parts No. | Parts Name | Treatment | Repair success |
| 1 | XXXX | X1XX2X | Replace | 80% |
| 2 | XXYY | X1XY2Y | Replace | 90% |
| 3 | XXZZ | X1XZ2Z | Adjust | 80% |
| . | . | . | . | . |
| . | . | . | . | . |
| . | . | . | . | . |

FIG. 4

LooK 1 : DTC, MODEL TYPE, MODEL YEAR, MANUFACTURE NATION

LooK 2 : DTC, MODEL TYPE, MODEL YEAR,

LooK 3 : DTC, MODEL TYPE

LooK 4 : DTC, OPTION

LooK 5 : DTC, GRADE

FIG. 5

|  | FIRST TIME | SECOND TIME | THIRD TIME | 4TH TIME | 5TH TIME | 6TH TIME | 7TH TIME |
|---|---|---|---|---|---|---|---|
| FIRST CONDITION | 70% OR HIGHER | 70% OR HIGHER | 70% OR HIGHER | 70% OR HIGHER | 70% OR HIGHER | 60% OR HIGHER | 50% OR HIGHER |
| SECOND CONDITION | 5 CASES OR MORE | 5 CASES OR MORE | 5 CASES OR MORE | 5 CASES OR MORE | 1 CASE OR MORE | 1 CASE OR MORE | 1 CASE OR MORE |
| THIRD CONDITION | SHARE RATIO OF HIGH-RANKING 5 METHODS IS 60% | SHARE RATIO OF HIGH-RANKING 5 METHODS IS 40% | SHARE RATIO OF HIGH-RANKING 5 METHODS IS 20% | NO CONDI-TIONS | NO CONDI-TIONS | NO CONDI-TIONS | NO CONDI-TIONS |

REPAIR SEARCH SYSTEM

CROSS-REFERENCE TO RELATED APPLICATION

This application is based upon and claims the benefit of priority from Japanese Patent Application No. 2023-050890 filed on Mar. 28, 2023, the content of which is incorporated herein by reference.

BACKGROUND OF THE INVENTION

Field of the Invention

The present invention relates to a repair search system for searching an appropriate repair method.

Description of the Related Art

As a technique for searching, there is a known technique for searching the entire text of article data simultaneously in parallel with use of a plurality of different search conditional expressions and providing a result that matches a search conditional expression (for example, see JP 2002-157270 A).

In such a conventional technique, in a case where a large number of articles match a search condition, it is necessary for a user to narrow down the number of articles by, for example, changing the search conditional expression. In addition, the conventional technique is not related to a technique for searching for a repair method.

SUMMARY OF THE INVENTION

An aspect of the present invention is a repair search system proposing a repair method corresponding to a trouble code, the repair search system including a microprocessor and a memory coupled to the microprocessor. The memory has a database storing the trouble code and the repair method performed in a past in association with each other, and the microprocessor is configured to perform: by using a plurality of different search conditions created with the trouble code of a troubled vehicle as a reference, searching the database for a plurality of repair methods corresponding to the trouble code by every search condition; scoring each of repair method groups included in a search result acquired by every search condition; and outputting information indicating a repair method group with a highest score among the repair method groups.

BRIEF DESCRIPTION OF THE DRAWINGS

The objects, features, and advantages of the present invention will become clearer from the following description of embodiments in relation to the attached drawings, in which:

FIG. 1 is a diagram illustrating an example of a repair method list acquired by a repair search system;

FIG. 4 is a diagram illustrating search conditions;

FIG. 5 is a diagram illustrating relaxing of the search conditions; and

DETAILED DESCRIPTION OF THE INVENTION

Figure 2:
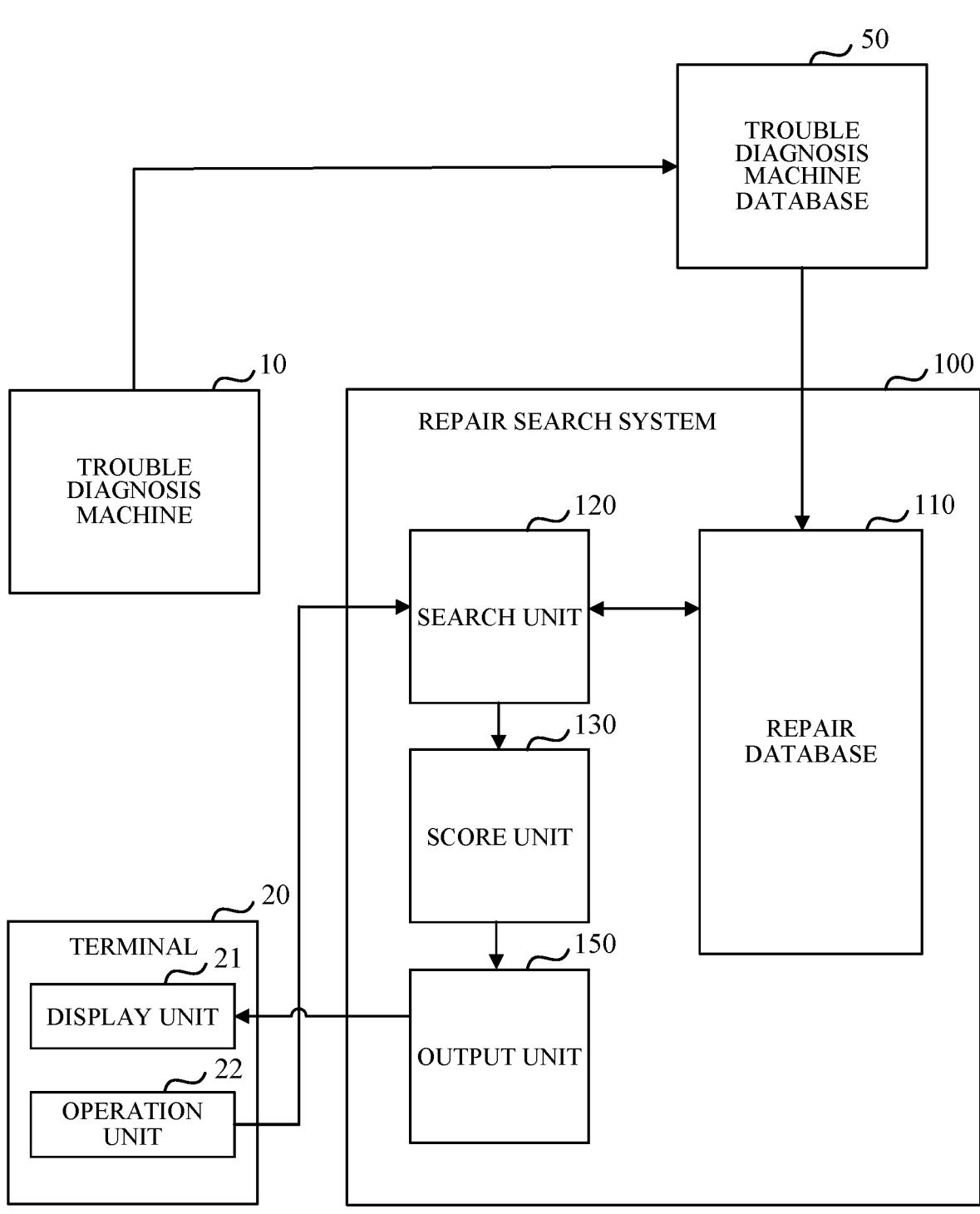
FIG. 2 is a schematic diagram illustrating a configuration of the repair search system.

Hereinafter, embodiments of the invention will be described with reference to the drawings.

<Outline of Repair Search System>

A repair search system according to an embodiment of the present invention proposes an appropriate repair method so that a vehicle of a repair object can be repaired at one time. For example, with use of a database in which repair records about vehicles in the past are stored, a plurality of repair methods that have been searched for, based on a diagnostic trouble code (DTC) obtained from the vehicle of the repair object are output to a terminal of a user (a mechanic who performs maintenance work of the vehicle in a maintenance factory or the like). In order to propose a more appropriate repair method to the user, the repair search system adopts a search condition of a database, based on a score result obtained by scoring a search result. With such a configuration, from an enormous number of repair records stored in the database, a repair method that matches the DTC of the vehicle of the repair object is searched for, and in addition, a plurality of repair methods each having a high-repair success rate are narrowed down, and are proposed to the user.

FIG. 1 is a diagram illustrating an example of a repair method list proposed by the repair search system. The repair method list is listed, for example, as component part information of a component part that should be replaced or adjusted (hereinafter, referred to as an object component part), and is displayed on a display unit of the terminal used by the user. The repair method list includes at least a component part number (Parts number) column, a component part name (Parts Name) column, a treatment (Treatment) column, and a repair success rate (Repair Success) column for an object component part.

On the display unit, information of a vehicle (Vehicle Information) and a search condition (Search Condition) are displayed together with the repair method list. As an example of the information of the vehicle, a vehicle identification number (Vehicle Identification Number: referred to as VIN), a model name (Model), a model year (Model Year), and a factory of manufacture (Factory) are displayed. Note that in general, the VIN includes information indicating a nation of manufacture, a manufacturer, a model type, a model year, a motor, a grade, and the like. The model name may be referred to as a model type.

In addition, as an example of the search information, a DTC and a search condition (may be referred to as a Look) are displayed. In an embodiment, a search condition of the database is configured to be changeable in five stages, for example. The repair search system searches for a repair method in parallel by setting the above five-stage search conditions. The five-stage search conditions are set to gradually expand a narrowed range, and will be referred to as "Look_1", "Look_2", "Look_3", "Look_4", and "Look_5" sequentially from the narrowest one of the narrowed ranges.

In the example of FIG. 1, a repair method list including a plurality of repair methods that have been searched for, in a case where the search condition is "Look_1", is displayed. Whenever the user performs a tap operation on a "Look_+" button, the user is able to change and display the repair method list obtained when changing the search condition to "Look_2", "Look_3", or the like. In addition, whenever the user performs a tap operation on a "Look_–" button, the user is able to change and display the repair method list obtained when changing the search condition to "Look_5", "Look_4", or the like.

The repair search system that provides the user with the repair method list as described above will be described in more detail.

<Configuration of Repair Search System>

FIG. 2 is a block diagram illustrating a configuration of a substantial part of the repair search system. A repair search system 100 is configured with, for example, one or a plurality of server apparatuses, and includes a repair database (Data Base: hereinafter referred to as DB) 110, a search unit 120, a score unit 130, and an output unit 150. The server apparatus is managed by, for example, a business entity or the like that provides vehicle maintenance services. The server apparatus may be configured with use of a virtual server function on a cloud, or may be configured to be distributed in a plurality of terminals. As an example, they may be arranged in a distributed manner for every predetermined management region or for every predetermined vehicle type.

The repair DB 110 stores the repair methods for vehicles. For example, work methods such as replacement of component parts and adjustments to component parts that have been performed in the past are classified for every corresponding DTC, every model type, every model year, every trouble case, and the like, and are recorded to be easily referred to as the repair methods for repairing troubles. In addition, a DTC and a repair method are associated with each other on a one-to-one basis, and many cases associated in this manner are recorded. The purpose of limiting to a one-to-one basis is to ensure the accuracy of search (search for a repair method for repairing a vehicle of a repair object at one time) in an embodiment. The association between the DTC and the repair method is performed at the time when the repair of the vehicle is finished, after a predetermined period (for example, 30 days) elapses from reception of the DTC, and is recorded in the repair DB 110.

The search unit 120 searches the repair DB 110 for a repair method in parallel by setting the above-described five search conditions ("Look_1" to "Look_5"), based on the information of the vehicle of the repair object that has been transmitted from a terminal 20.

The score unit 130 scores a plurality of repair methods that have been searched for by the search unit 120 by every search condition ("Look_1" to "Look_5"). Scoring is performed, for example, based on three perspectives. In a first perspective, an evaluation point is calculated, based on whether a repair success rate, at which the repair of the vehicle is successful in accordance with the repair that adopts such a repair method, is equal to or higher than a predetermined probability a (for example, 70%).

In a second perspective, an evaluation point is calculated, based on whether the number of repair cases (referred to as the number of WTY cases) that adopt the repair method satisfying the above first perspective is equal to or larger than a predetermined number of cases (for example, five cases).

In a third perspective, an evaluation point is calculated, based on whether the repair methods of a predetermined number of (for example, five) high-ranking WTY cases among the plurality of repair methods that have been searched for by every search condition occupy equal to or larger than a predetermined share ratio (for example, 60%)

with respect to the number of WTY cases of all repair methods that have been searched for by such a search condition.

A score result by the score unit 130 is an evaluation value for the plurality of repair methods that have been searched for by every search condition, and can also be said to be an evaluation value of each search condition used for searching for those repair methods.

The output unit 150 outputs a display signal of the repair method list illustrated in FIG. 1 to the terminal 20 used by the user. More specifically, a display signal of a repair method list including a plurality of repair methods that have been searched for by the search condition having the highest score value by the score unit 130, from among the plurality of repair methods that have been respectively searched for by each search condition, is output to the terminal 20.

The repair search system 100 acquires information to be recorded in the repair DB 110 from a trouble diagnosis machine database 50. In the trouble diagnosis machine database 50, vehicle information of a vehicle of a repair object that has been collected by a trouble diagnosis machine 10, which is connected with the vehicle of the repair object in a maintenance factory or the like, is collected. As described above, the vehicle information is uploaded (Upload) to the trouble diagnosis machine database 50 at the time when the repair of the vehicle of the repair object is finished. The repair search system 100 acquires the vehicle information including the DTC from the trouble diagnosis machine database 50, and records the DTC and the repair method in association with each other in the repair DB 110.

The trouble diagnosis machine 10 for vehicles deployed in the maintenance factory or the like and the trouble diagnosis machine database 50 are configured to be communicable through a communication network, not illustrated. The communication network includes not only a public wireless communication network represented by the Internet networking, a mobile telephone network, or the like, but also a closed communication network provided in every predetermined management region, for example, a wireless local area network (LAN), Wi-Fi (registered trademark), or the like.

In addition, the terminal 20 used by the user and the repair search system 100 are also configured to be communicable with each other through the above communication network. The repair search system 100 includes a communication unit, not illustrated, and is connected to the communication network via the communication unit.

In FIG. 2, only one trouble diagnosis machine 10 and one terminal 20 are illustrated. However, a plurality of trouble diagnosis machines 10 and a plurality of terminals 20 may be present. The terminal 20 is configured with, for example, a tablet computer. The terminal 20 includes: a display unit 21, which displays the repair method list or the like that has been provided from the repair search system 100; and an operation unit 22 as an example of a touch operation member provided on a display surface of the display unit 21.

<Description of Flowchart>

Figure 3:
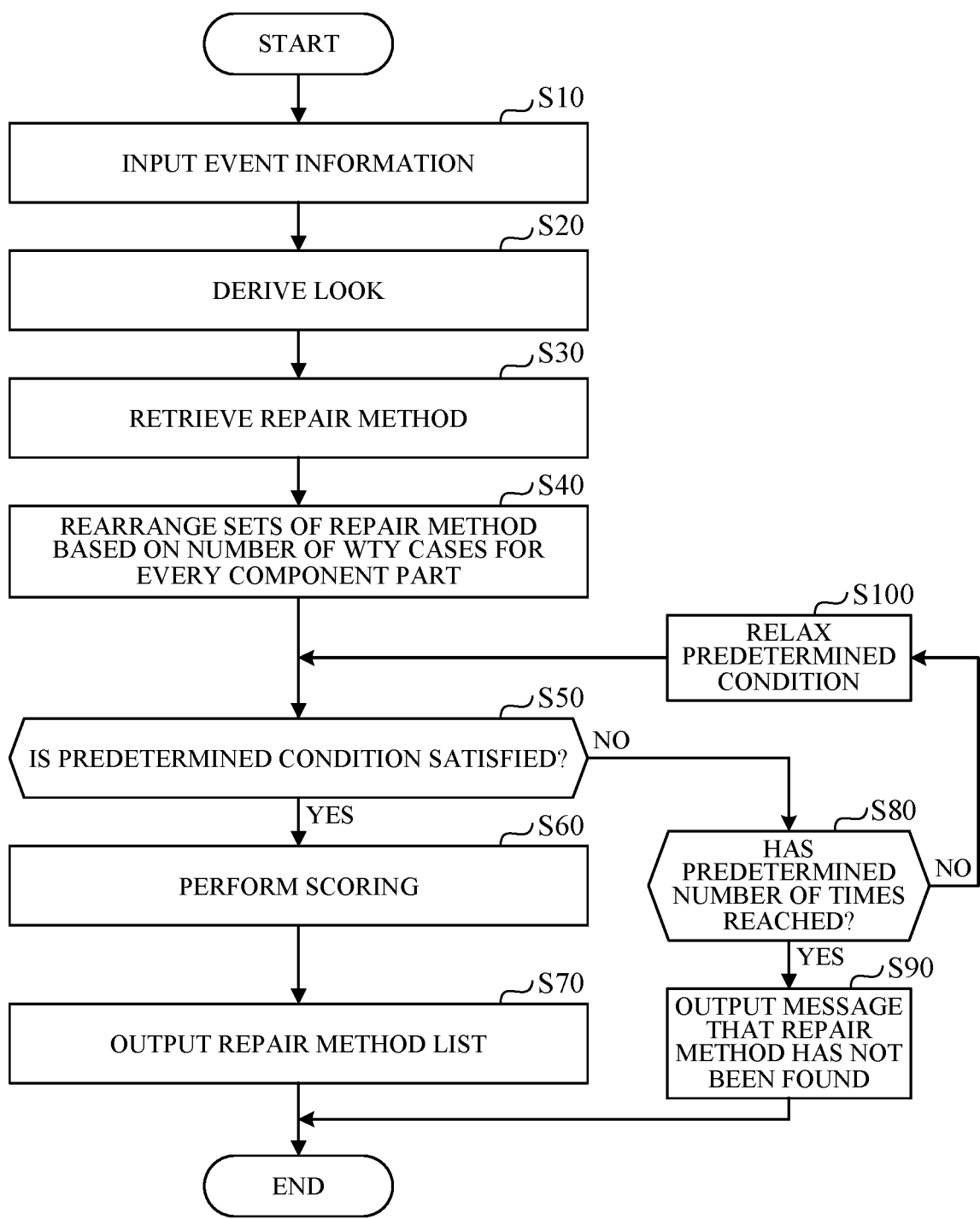
FIG. 3 is a flowchart for describing an example of processing of creating the repair method list in FIG. 1 to be performed in the repair search system in FIG. 2.

FIG. 3 is a flowchart for describing a flow of processing of creating a repair method list to be performed by the server apparatus of the repair search system 100. The repair search system 100 repeatedly performs the processing illustrated in FIG. 3.

In step S10, the repair search system 100 receives inputs of event information of a vehicle of a repair object that has been transmitted from the terminal 20, and proceeds to step S20. The event information includes a VIN, a DTC, a trouble symptom, and the like, as an example.

In step S20, the repair search system 100 derives Looks as search conditions for searching the repair DB 110, and proceeds to step S30. More specifically, a predetermined number of Looks are derived, based on the DTC input in step S10. In an embodiment, the predetermined number is set to, for example, five, and five Looks of "Look_1" to "Look_5" are derived.

FIG. 4 is a diagram illustrating Looks as the search conditions. From an enormous number of repair records stored in the repair DB 110, Looks for narrowing down to a plurality of repair methods that match the DTC of the vehicle of the repair object are derived by combining the DTC with the model type or the like. In an embodiment, Looks are derived such that the narrowed range by "Look_1" is set to the narrowest one, and the narrowed range gradually expands in the order of "Look_2", "Look_3", and so on.

In step S30, the repair search system 100 retrieves a repair method corresponding to the DTC, and proceeds to step S40. The retrieval is performed by the search unit 120. The search unit 120 refers to the repair DB 110, and retrieves a plurality of repair methods corresponding to the DTC in parallel by respectively using the five Looks "Look_1" to "Look_5". The retrieval may be referred to as search. By the retrieval in step S30, five sets of repair methods are obtained.

In step S40, the repair search system 100 rearranges a plural sets of repair methods obtained by every Look, based on the number of WTY cases for every component part of the repair object in the repair method, and proceeds to step S50. For example, in a case where a set of repair methods includes replacement of a battery, replacement of a generator, and replacement of a connection cable, the battery, the generator, and the connection cable as component parts are rearranged in descending order, based on the number of WTY cases. Such a rearrangement is performed for every Look.

In step S50, the repair search system 100 determines whether a predetermined condition is satisfied for the plural sets of repair methods for every Look that has been rearranged. The predetermined condition includes, for example, three conditions corresponding to the above-described three perspectives at the time of scoring.

A first condition is assumed that the repair success rate, at which the repair of the vehicle is successful in accordance with the repair that adopts such a repair method, is higher than the predetermined probability a.

A second condition is assumed that the number of repair cases (referred to as the number of WTY cases) that adopt the repair methods satisfying the above first condition is equal to or larger than a predetermined number of cases (for example, five cases).

A third condition is assumed that the number of WTY cases, which adopt a predetermined number of (for example, five) high-ranking repair methods among the plurality of repair methods that have been searched for by every search condition, occupy equal to or larger than a predetermined share ratio (for example, 60%) with respect to the number of WTY cases of all repair methods that have been searched for by such a search condition. In other words, in a case where the plurality of repair methods that have been searched for by such a search condition are arranged in descending order based on the number of WTY cases, and high-ranking repair methods corresponding to a predetermined ratio (60%) of the number of WTY cases with respect to the entire number (total number) of WTY cases of the plurality of repair methods are selected, the selected number of repair methods is small (equal to or smaller than five).

In a case where there is a Look that satisfies the above first to third conditions in a plural sets of repair methods for every Look, the repair search system 100 makes an affirmative determination in step S50, and proceeds to step S60. In a case where there is no Look that satisfies the first to third conditions, the repair search system 100 makes a negative determination in step S50, and proceeds to step S80.

In step S60, the repair search system 100 performs predetermined scoring, and proceeds to step S70. Scoring is performed by the score unit 130.

In step S70, the repair search system 100 outputs, to the terminal 20, a display signal of the repair method list (FIG. 1) including a plurality of repair methods, and ends the processing of FIG. 3. The output is performed by the output unit 150. The output unit 150 outputs, to the terminal 20, the display signal of the repair method list including a plurality of repair methods that have been searched for by a Look having the highest score value by the score unit 130, from among a plurality of repair methods that have been respectively searched for by "Look_1" to "Look_5" as the search conditions and that satisfy the predetermined condition. Note that as described above, the repair method list is created as a list of an object component part group that should be replaced or adjusted.

In a case where there is no Look that satisfies the predetermined condition, the repair search system 100 makes a negative determination in step S50, and then in step S80, determines whether the determination processing in step S50 has been repeated a predetermined number of times. In a case where the repeated number of times of the determination processing has reached a predetermined number (for example, seven times), the repair search system 100 makes an affirmative determination in step S80, and proceeds to step S90.

In step S90, the repair search system 100 outputs, to the terminal 20, a display signal for displaying a message that the repair method corresponding to the DTC has not been found, and ends the processing of FIG. 3. In an embodiment, in a case where the repair method corresponding to the DTC has not been found, it is not possible to present a recommended replacement component part to the user.

On the other hand, in a case where the repeated number of times of the determination processing has not reached the predetermined number, the repair search system 100 makes a negative determination in step S80, and proceeds to step S100. In step S100, the repair search system 100 relaxes the predetermined condition, returns to step S50, and determines whether the predetermined condition is satisfied by using the relaxed predetermined condition with regard to the plural sets of repair methods by every Look that has been rearranged.

FIG. 5 is a diagram illustrating relaxing of the predetermined conditions (the first to third conditions). The repair search system 100 relaxes the predetermined probability in the first condition, in a case where the repeated number of times of the determination processing increases. In addition, the repair search system 100 relaxes the predetermined number of cases in the second condition, in the case where the repeated number of times of the determination processing increases. Furthermore, in the case where the repeated number of times of the determination processing increases, the repair search system 100 relaxes the share ratio in the third condition, or removes the third condition itself.

Note that the relationship between the repeated number of times and the relaxing of the first condition to the third condition illustrated in FIG. 5 is an example, and may be appropriately changed.

In step S70 described above, the repair search system 100 is configured to be capable of outputting, to the terminal 20, a display signal of a repair method list including a plurality of repair methods that have been searched for by another Look. For example, when a signal indicating that the user has performed a tap operation on the "Look+" button on the display screen of the display unit 21 of the terminal 20 is transmitted from the terminal 20 of the user, the number of the currently displayed Look among the "Look_1" to "Look_5" is incremented by one, and a display signal of a repair method list including a plurality of repair methods that have been searched for by such a Look is output to the terminal 20. In addition, when a signal indicating that the user has performed a tap operation on the "Look−" button on the display screen of the display unit 21 of the terminal 20 is transmitted from the terminal 20 of the user, the number of the currently displayed Look among the "Look_1" to "Look_5" is decremented by one, and a display signal of a repair method list including a plurality of repair methods that have been searched for by such a Look is output to the terminal 20. This enables the user to confirm the repair method that has been searched for by the Look that is different from the Look based on the score result in step S60 by the repair search system 100.

In addition, in step S70 described above, the repair search system 100 may output, to the terminal 20, a display signal of a repair method list including a set of repair methods having a repair success rate equal to or lower than a predetermined probability b (for example, 50%) (such a set may be referred to as a low-success probability group). This enables the user to confirm the repair method of the group having a low-success probability that is different from the repair method of the group having a high-success probability.

Figure 6:
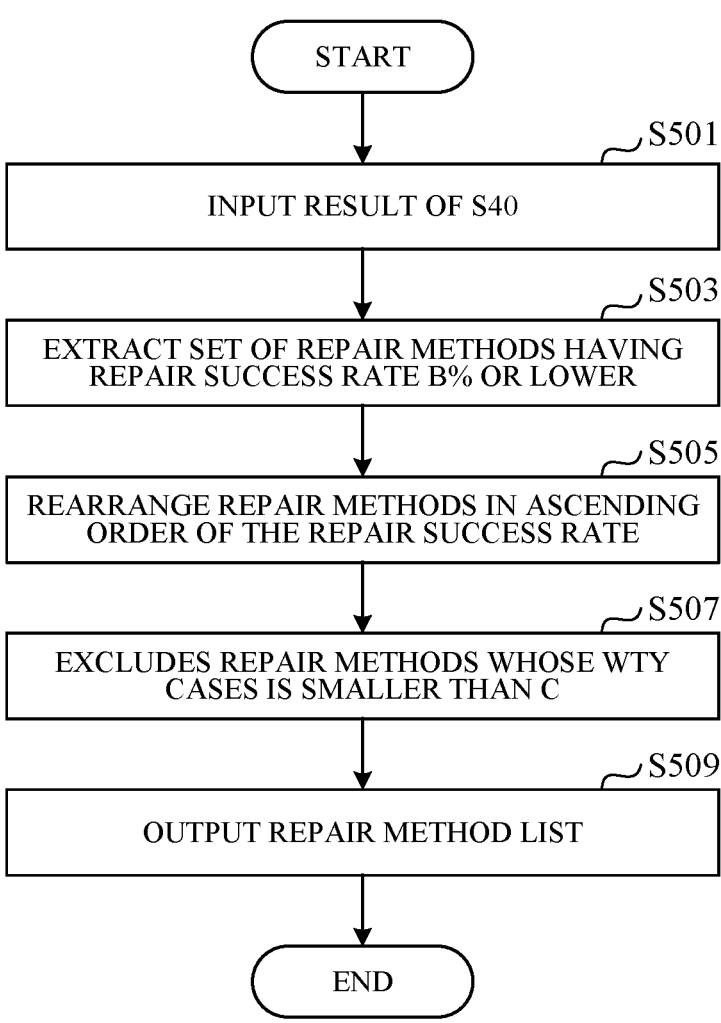
FIG. 6 is a flowchart for describing an example of processing of creating another repair method list.

FIG. 6 is a flowchart for describing a flow of processing of creating a repair method list having a low-success probability to be performed by the server apparatus of the repair search system 100. For example, the repair search system 100 performs the processing illustrated in FIG. 6 in parallel with score processing in step S60.

In step S501, the repair search system 100 receives inputs of a result of the rearrangement processing in step S40, and proceeds to step S503. Accordingly, the plurality of repair methods that have been obtained by every Look are input in a rearranged order based on the number of WTY cases for every component part.

In step S503, the repair search system 100 extracts a set of repair methods having a repair success rate equal to or lower than a predetermined probability b %, and proceeds to step S505.

In step S505, the repair search system 100 rearranges the plurality of repair methods sequentially from the lowest one (in ascending order) of the repair success rate, and proceeds to step S507.

In step S507, the repair search system 100 excludes the number of repair cases, in which the number of WTY cases is smaller than a predetermined number c (for example, ten), from the plurality of repair methods that have been rearranged, and proceeds to step S509.

In step S509, the repair search system 100 outputs, to the terminal 20, a display signal of a repair method list including a plurality of repair methods having a low-success probability, and ends the processing of FIG. 6. The output is performed by the output unit 150. Note that as described above, the repair method list is created as a list of an object component part group that should be replaced or adjusted.

According to the embodiments described above, the following operations and effects are achievable.

(1) The repair search system 100 that presents a repair method corresponding to a DTC as a trouble code, includes: the repair DB 110 that stores the DTC and the repair method performed in the past in association with each other; the search unit 120 that searches the repair DB 110 for a plurality of repair methods corresponding to the DTC by every search condition Look by using a plurality of different search conditions Looks that have been created with the DTC of a troubled vehicle as a reference; the score unit 130 that scores each of the plurality of repair methods (hereinafter, referred to as a repair method group) included in a search result that has been acquired by every search condition Look by the search unit 120; and the output unit 150 that outputs information indicating a repair method group having a highest score that have been scored by the score unit 130.

With this configuration, the user is able to obtain the repair method group that has been searched for by the search condition Look having the highest score value among the repair method groups that have been respectively searched for by the plurality of search conditions Looks, via the display unit 21 of the terminal 20. That is, it becomes possible to obtain the repair method group (a plurality of repair methods) appropriate for a trouble.

(2) In the repair search system 100 of the above (1), the output unit 150 outputs a list obtained by arranging the repair methods included in the repair method group having the highest score that has been scored by the score unit 130 in descending order of the number of repair success cases.

With this configuration, from an enormous number of repair records stored in the repair DB 110, it becomes possible to present, to the user, the repair methods that match the DTC of the vehicle of the repair object sequentially from the largest number of the repair success cases.

(3) In the repair search system 100 of the above (1), the output unit 150 outputs a list obtained by arranging a component part of a repair object corresponding to each repair method included in the repair method group, as information of the repair method group having the highest score that has been scored by the score unit 130.

With this configuration, the user is able to recognize the component parts of the repair objects in the repair methods.

(4) In the repair search system 100 of the above (1), the score unit 130 scores each repair method group included in the search result that has been acquired by every search condition by the search unit 120 such that a repair method having a higher ratio of the number of repair success cases occupied in the number of repair cases is scored to be higher.

With this configuration, from an enormous number of repair records stored in the repair DB 110, it becomes possible to present, to the user, a repair method having a high-repair success rate among the repair methods that match the DTC of the vehicle of the repair object.

(5) In the repair search system 100 of the above (1), the score unit 130 scores each repair method group included in the search result that has been acquired by every search condition by the search unit 120 such that the repair method having a larger number of repair success cases is scored to be higher.

With this configuration, from an enormous number of repair records stored in the repair DB 110, it becomes possible to present, to the user, a large number of repair methods that match the DTC of the vehicle of the repair object.

(6) In the repair search system 100 of the above (1), in a case where the score unit 130 scores each repair method group included in the search result that has been acquired by every search condition by the search unit 120, the score unit 130 arranges the plurality of repair methods included in the repair method group in descending order based on the number of repair success cases (the number of WTY cases), selects, from the plurality of repair methods arranged in descending order, the high-ranking repair methods corresponding to a predetermined ratio (for example, 60%) of the number of WTY cases with respect to the total number of WTY cases of the plurality of repair methods, and scores the repair method group to be higher, as the number of repair methods that have been selected is smaller.

With this configuration, from an enormous number of repair records stored in the repair DB 110, it becomes possible to present, to the user, a repair method having a high-ranking occupied ratio of the number of repair cases WTY among the repair methods that match the DTC of the vehicle of the repair object.

(7) In the repair search system 100 of the above (1), a plurality of DTC and repair methods associated with each other on a one-to-one basis are stored in the repair DB 110.

With this configuration, it becomes possible to improve the accuracy of the search in an embodiment, as compared with a case where the DTC and the repair method are associated with each other on a one-to-many basis.

The above embodiments can be modified in various modes. Hereinafter, modifications will be described.
(First Modification)

In the above-described embodiment, an example in which the event information of the vehicle of the repair object is transmitted to the repair search system 100 via the terminal 20 has been described. However, it may be configured such that an access is made on wireless communication from the vehicle to a communication network, not illustrated, and the event information is directly transmitted from a diagnosis device mounted on the vehicle to the repair search system 100.
(Second Modification)

In the above-described embodiment, an example in which the trouble diagnosis machine 10 and the terminal 20 are separately configured has been described. However, the trouble diagnosis machine 10 and the terminal 20 may be connected with each other to enable data communication. In addition, the trouble diagnosis machine 10 and the terminal 20 may be integrally configured.

The above embodiment can be combined as desired with one or more of the above modifications. The modifications can also be combined with one another.

According to the present invention, it becomes possible to obtain a plurality of repair methods appropriate for a trouble.

Above, while the present invention has been described with reference to the preferred embodiments thereof, it will be understood, by those skilled in the art, that various changes and modifications may be made thereto without departing from the scope of the appended claims.

What is claimed is:
1. A repair search system proposing a repair method corresponding to a trouble code, the repair search system comprising
    a communication unit communicable to a terminal used by a user, the terminal having a display unit, a microprocessor and a memory coupled to the microprocessor, wherein
the memory has a database storing the trouble code and the repair method performed in a past in association with each other, and
the microprocessor is configured to perform, upon receiving event information of a troubled vehicle transmitted from the terminal via the communication unit and vehicle information for identifying the troubled vehicle:
creating a plurality of different search conditions based on the trouble code of the troubled vehicle included in the event information and the vehicle information;
executing, in parallel for each of the plurality of different search conditions, a process of searching the database for repair methods corresponding to the trouble code for each search condition;
acquiring a search result for each search condition;
scoring each repair method group included in the search result acquired for each search condition; and
outputting a display signal for displaying a list of repair methods included in the repair method group with a highest score among the repair method groups on the display unit to the terminal via the communication unit, wherein
the microprocessor is configured to perform
the outputting including, in response to receiving, from the terminal via the communication unit, a signal designating the search condition selected by the user among the plurality of different search conditions, outputting the display signal to switch the display unit to display a list of repair methods included in the repair method group corresponding to the search condition designated.

2. The repair search system according to claim 1, wherein the microprocessor is configured to perform
the outputting including outputting the display signal so that each of the repair methods included in the list is displayed in descending order of a number of repair success cases.

3. The repair search system according to claim 1, wherein the list is a first list, and
the display signal includes a signal for displaying a second list obtained by arranging a component part of a repair object corresponding to each of the repair methods included in the first list.

4. The repair search system according to claim 1, wherein the microprocessor is configured to perform
the scoring including scoring each of the repair method groups included in the search result acquired for each search condition such that a repair method with a higher ratio of a number of repair success cases occupied in a number of repair cases is scored to be higher.

5. The repair search system according to claim 1, wherein the microprocessor is configured to perform
the scoring including scoring each of the repair method groups included in the search result acquired for each search condition such that a repair method with a larger number of repair success cases is scored to be higher.

6. The repair search system according to claim 1, wherein the microprocessor is configured to perform
the scoring including, in a case where each of the repair method groups included in the search result acquired for each search condition is scored, arranging repair methods included in each of the repair method groups in descending order based on a number of repair success cases, selecting, from the repair methods arranged in descending order, high-ranking repair methods corresponding to a predetermined ratio of a number of repair success cases with respect to a total number of repair success cases of the repair methods, and scoring each of the repair method groups to be higher, as a number of repair methods selected in the selecting is smaller.

7. The repair search system according to claim 1, wherein a plurality of pairs associated with the trouble code and the repair method with each other on a one-to-one basis are stored in the database.

\* \* \* \* \*